United States Patent [19]

Byatt et al.

[11] Patent Number: 4,510,804
[45] Date of Patent: Apr. 16, 1985

[54] DISTANCE MEASURING

[75] Inventors: Dennis W. G. Byatt, Great Baddow; John W. Walker, Danbury, both of England

[73] Assignees: The Marconi Co. Ltd., Chelmsford; Occidental Refineries Ltd., London, both of England

[21] Appl. No.: 432,401

[22] Filed: Sep. 30, 1982

[51] Int. Cl.³ ............................................. G01N 23/28
[52] U.S. Cl. .................... 73/290 V; 367/104; 367/908
[58] Field of Search ................. 73/290 V, 633, 170 A; 33/1 P; 367/104, 908

[56] References Cited

U.S. PATENT DOCUMENTS

| | | | |
|---|---|---|---|
| 2,704,455 | 3/1955 | Duhamol et al. | 73/290 V |
| 2,869,108 | 10/1959 | Smith, Jr. | 73/290 V |
| 3,704,442 | 11/1972 | Wright | 73/290 V X |
| 3,721,312 | 3/1973 | St. John | 367/104 X |
| 3,800,272 | 3/1974 | Hitchcock | 367/104 X |
| 4,000,646 | 1/1977 | Mott et al. | 73/170 A |
| 4,210,969 | 7/1980 | Massa | 73/290 V X |
| 4,308,749 | 1/1982 | Clavelloux et al. | 73/170 A |
| 4,365,509 | 12/1982 | Cornelis | 73/290 V |

FOREIGN PATENT DOCUMENTS

| | | | |
|---|---|---|---|
| 1401731 | 7/1975 | United Kingdom | 73/290 V |
| 1399977 | 7/1975 | United Kingdom | 73/290 V |
| 1496279 | 12/1977 | United Kingdom | 73/290 V |
| 2025665 | 1/1980 | United Kingdom | |
| 1587617 | 4/1981 | United Kingdom | 73/290 V |
| 149640 | 12/1961 | U.S.S.R. | 73/290 V |

Primary Examiner—Daniel M. Yasich
Attorney, Agent, or Firm—Spencer & Frank

[57] ABSTRACT

Apparatus for measuring and indicating the settlement of the floor of a large liquid containing vessel such as an oil storage tank. The apparatus comprises sonic echo sounding means positioned at or movable between each of a multiplicity of spaced points disposed within the vessel and above its floor in known relationship one with another, and ranging means for furnishing for each point, and upon the basis of the echo sounding means output, a measure of the distance from the point to the vessel floor and an indicator (preferably visual) for indicating from the ranging results the settlement of the floor below those points. In preferred embodiments, the surface of the liquid within the vessel is utilized as a datum and the arrangement may be adapted to provide an indication of the volume of liquid within the vessel.

16 Claims, 7 Drawing Figures

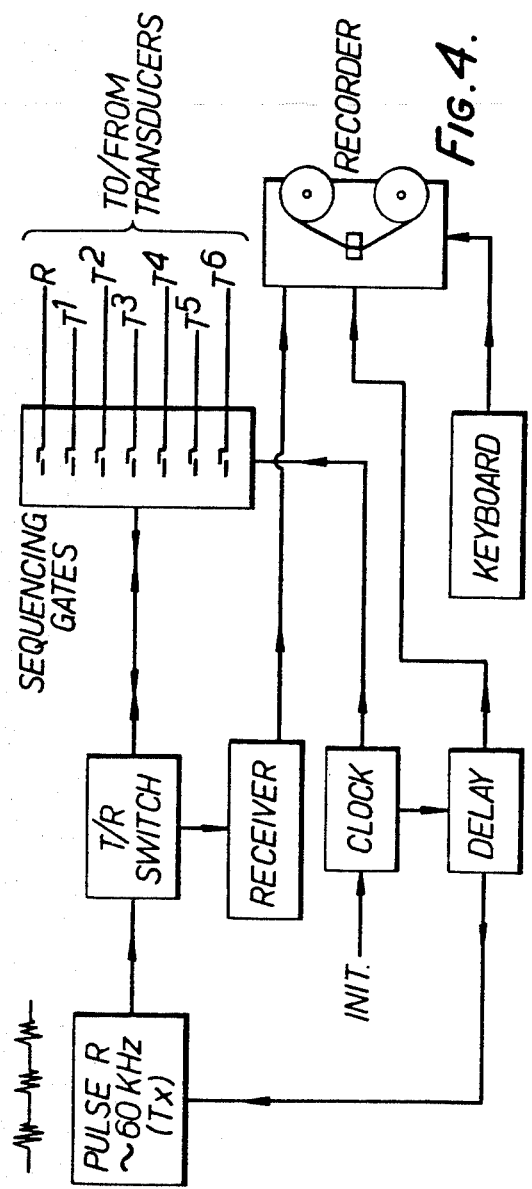
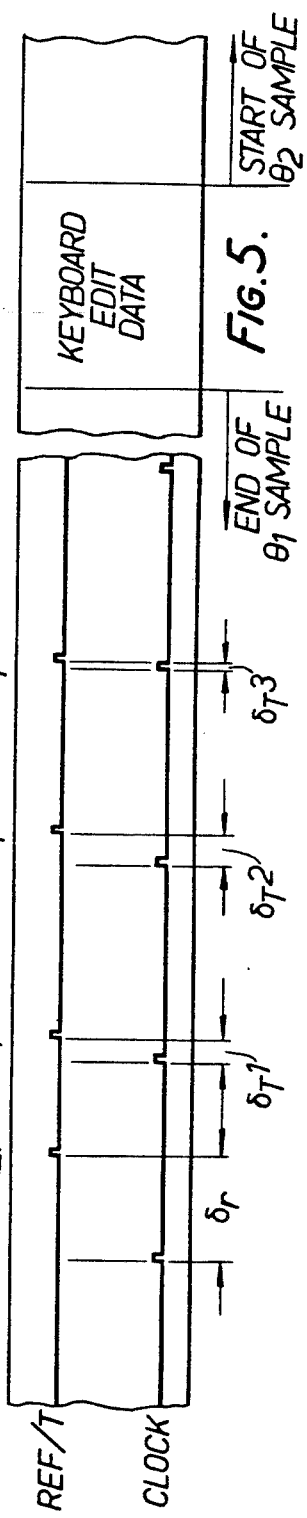

DISTANCE MEASURING

BACKGROUND OF THE INVENTION

This invention relates to measurement or monitoring functions and in particular to measurement or monitoring functions associated with large liquid-containing vessels such as oil storage tanks.

One vital measurement or monitoring function is that of base plate deformation in such vessels, which deformation arises as follows.

One presently accepted common method of building large vessels for containing liquid, for example, storage tanks for the bulk storage of oil, uses a construction technique in which the foundations for the tank consist of a "ring" of compacted rock or concrete. Such a tank is known as a "soil supported" tank.

Unfortunately, soil supported tanks suffer from differential settlement of a number of kinds (axial, peripheral and base plate), and whilst the tank design can allow for some such settlement, it cannot cope with excessive amounts. Accordingly, in order to monitor the actual settlement, various measurements have to be taken of the tank's dimensions over a test period (commonly of at least a year) during which it is slowly filled, meter by meter, with liquid (commonly water) not only to check that the tank does not leak but also to assist in the satisfactory consolidation of the foundation sub-soil. Indeed such measurements have to be checked throughout the period that the tank is in service and the life of a typical bulk oil storage tank may well be in excess of twenty years. Measurement of axial and peripheral settlement can relatively easily be effected from outside the tank, but measurement of base plate settlement cannot, and presently causes much difficulty (part of which is that current methods are too simple to give good, detailed, results).

SUMMARY OF THE INVENTION

It is one object of this invention to provide a novel method and apparatus for measuring storage tank base plate settlement or distortions allowing the obtention of very detailed results and yet being at the same time relatively simple and cheap.

According to one aspect of this invention, a monitoring or measuring arrangement comprises means, disposed within or capable of being positioned within a liquid containing vessel, for effecting a sonic echo sounding from each of a number of spaced points disposed within the vessel and above its floor, whereby a measure is obtained related to the distance of each point to the vessel floor.

Preferably said sonic echo sounding means is or are positioned within said vessel to be normally below the surface level of liquid in said tank.

Preferably again the arrangement is such that there is used as a datum level the surface of liquid in said vessel, all distances being determined either actually or in effect from that surface datum level.

The measurements thus obtained may be utilised to provide a pattern of measurements relating to the behaviour of the floor of said vessel either within the period of hydrostatic testing and/or soil consolidation during initial commissioning and filling of the vessel, or during service. By this means various settlements or distortions of the floor (e.g. axial differential settlement and peripheral differential settlement) may be monitored or indicated.

In addition, or alternatively, the measurements thus obtained may be utilised to provide a measure of the volume of liquid contained within the vessel which, unlike a simple measurement of the height of the surface of the liquid, tends to take into account such last mentioned settlements or distortions.

In another aspect of this invention there is provided a method of detecting the settlement or distortions of the floor (base plate) of a liquid-containing vessel, such as an oil storage tank, in which method sonic echo sounding from each of a number of spaced points disposed within the vessel and above its floor in known relationship one with another is used to furnish a measure of the distance from each point to the vessel floor, and from the results there is detected the settlement (if any) of the floor below those points.

In some embodiments, the invention provides apparatus for detecting the settlement of the floor (base plate) of a liquid-containing vessel such as an oil storage tank, which apparatus comprises: sonic echo sounding means positioned at or movable between each of a multiplicity of spaced points disposed within the vessel and above its floor in known relationship one with another: ranging means to furnish for each point upon the basis of the echo sounding means output a measure of the distance from the point to the vessel floor; and indicator means for indicating from the ranging results the settlement (if any) of the floor below those points.

The invention uses sonic echo sounding—that is to say, echo sounding using radiated sound as opposed to, for instance, radar. The frequency of the sound is an important factor in determining the accuracy of the results. For most purposes it will be necessary to "measure" distances to within at least one inch (about 2.5 cms), so that the frequency of the sound must be such that the sound wavelength is less than this. On a very rough basis, sound travels through liquids at about 5000 ft/sec (about 1500 m/sec) so, using the expression velocity equals frequency times wavelength it is clear that the frequency must be greater than 5000/(1/12), or about 60000 Hz, which is well into the ultrasound region.

The sound employed to allow the sonic echo sounding may be generated and received by any convenient apparatus, typically an electric signal-to-sound (and vice versa) transducer. It is common these days for ultrasound to be generated using a piezoelectric transducer and such a transducer, using as the piezoelectric material a quartz crystal or a piece of polarised plastics materials such as polyvinylidene fluoride (PVDF) is perfectly satisfactory. Naturally the transducer is, in use, connected up to a suitable source of electrical signals (for generating the ultra-sonic sound when it is operated in the transmitter mode) and to suitable equipment for detecting its output (when it is operated in receiver mode).

It will be appreciated that where liquids of a highly volatile, inflammable nature are concerned care must be exercised to avoid sparking. If therefore electric transducers are used within the vessel these should either be encapsulated or otherwise "spark-proofed" or suitably low voltages should be used. Alternatively it may be desirable to avoid electric signals within the tank altogether in which case pneumatically or mechanically operated transducers may be used within the tank with acoustic/electrical conversion (if required) outside of the tank.

The number of points at which the echo sounding is effected depends upon the definition desired of the resulting "picture" of the vessel floor (which in turn depends upon the size of the floor) and upon the cost. By way of example, however, for an oil storage tank 100 ft (about 30 m) in diameter, acceptable results are obtained if the points are about 3 ft (90 cm)—say, from 2 to 5 ft (from 60 to 150 cm)—apart.

The disposition, one from another, of said spaced points at which echo-sounding is effected are preferably evenly distributed over the floor area and preferably regularly disposed in a grid pattern. One preferred grid pattern is a radial grid pattern centred on the floor centre, said spaced points being regularly spaced outwardly from the floor centre along radii, each radius being equiangularly spaced from its immediate neighbours. In such a case, a floor picture of acceptable definition is obtained for a 100 ft diameter tank if the points are spaced radially in multiples of 3 ft and angularly in multiples of 10°.

Whilst said points may be at different heights above the vessel floor, preferably all of said spaced points are at, or near, the same height. However, their actual height becomes of less importance if the surface of the liquid (or in other words, the liquid interface) within the vessel is used as a datum level, all distances being determined either actually or in effect from that surface datum level: the computation required depends upon whether the echo sounding points are below, on or above the surface level (as discussed further hereinafter) but it is relatively simple to relate all floor depths to the surface, so making unnecessary a knowledge of the exact height of each echo sounding point.

The points where the echo sounding is effected may, as stated hereinbefore, be below, at or above the surface of the liquid in the vessel. However, if the points are above the surface then it is difficult to receive any echo from the vessel floor, whilst if the points are on the surface then it is additionally necessary for the echo sounding means at those points so to be mounted that they can move up and down with the surface. Preferably, therefore, the points are all below the surface, and most conveniently they are all in a plane roughly two to three feet (60 to 90 cm) above the vessel floor.

The means for effecting the echo sounding may be provided as a static arrangement, wherein each point has echo sounding means permanently positioned thereat. However, transducers tend not to be cheap, and rather than employ a large number in such a static arrangement, it may be more convenient to employ a much smaller number and move them from one set of points to another—as the "measurement" proceeds. This is made easier if the points are in a regular array. For example, using the preferred radial array there need only be sufficient transducers in one set to fill the positions in one radius; after the readings have been taken there the set is swung sideways into place along the next radius; and so on. Indeed one transducer alone may be used, the arrangement being such that one transducer is moved from spaced point to spaced point as the "measurement" proceeds.

Preferably however, the echo sounding means are disposed along a substantially rigid boom pivotally mounted at the vessel floor's centre so that it can sweep over the floor as the hand of a clock sweeps over the clock face. The boom may be a single arm boom (with an appropriate counterweight), or it may be a "double arm" boom, extending on either side of a central pivot point—indeed, if desired, it may be triple or quadruple arm boom (and so on) though a double arm boom is presently preferred.

The invention gathers the data obtained by echo sounding from each of the chosen points, and uses it to furnish a measure of the distance from each point to the vessel's floor beneath the point. The data itself is in the form of electronic pulses fed to and received from the echo sounding means and in effect constitutes times—times of generating pulses, and times of receiving echoes from either the floor or the surface; from these times may be derived the required distance information. Conveniently the data may be recorded onto magnetic tape. However, quite how this distance measure is calculated, and whether it be an absolute or a relative measure, naturally depends upon the particular embodiment of the invention—and, especially, upon the level of the chosen points. In the preferred case, with all the points in a plane in the liquid about two to three feet above the floor (and thus forty to forty-five feet below the liquid surface when the tank is full) the distance between the floor and the surface is represented by the sum of the echo-return times for the two, while if the points are on the surface, or above the surface, then the distance is represented respectively by the (sole) time and the difference of the two times. The ranging means referred to hereinbefore is the means—timing, computational and so on—that performs whatever actions are necessary to derive the required distance measure from the echo data.

From the derived measure of the floor distance may be detected (and indicated) any settlement. The indication may take any convenient format—including for example the sounding of an aural alarm—but preferably this is in visible form. Thus, the data may be manipulated so that it is viewable as contour lines, as a floor section profile, or just as a set of figures, and may be so viewed either as printed out on paper or as displayed on a TV type screen. Moreover the successive sets of data produced may be analysed to determine the rate at which settlement is occurring.

In operation, the invention will conveniently involve the emplacement within a vessel—specifically, within each of a series of vessels such as oil storage tanks—of sonic echo sounding means and the associated supporting (and moving) apparatus (for example, the floor-sweeping boom arrangement referred to herein), followed by the connecting of the sounding means to activating and data reading and recording means whereby there may be obtained the necessary information to allow the furnishing of the required sounding-point-to-floor measure, which itself allows the detection/indication of any floor settlement. It is envisaged that each combination of sounding means and the supporting (and moving) apparatus need not have its own activating and data reading and storing means, but may share such means common to a whole series of such combinations. Thus, in an oil storage tank depot for instance, up to 50 tanks might each contain its own sounding means combination, a single activating/reading/storing means being moved sequentially from tank to tank to gather the data, thereafter bringing that data back to some control point for analysis.

The boom echo sounding means mounting arrangement described herein for use submerged in the liquid is itself novel and inventive, and in another aspect this invention provides such a device for use in or with the base plate detecting method and apparatus of the invention. Thus, the invention provides, for mounting within and coaxially of a large vessel such as an oil storage tank, an echo sounding means support and movement arrangement which comprises: a longitudinally-extended boom member adapted to be pivotally mounted at or near one end centrally of the vessel floor for movement in a plane parallel thereto; means for causing the boom to move in that plane, rotating about its pivot mounting; and a plurality of ultrasonic echo sounding means mounted along the boom, some pointing towards the vessel floor and some pointing away therefrom but at least one pointing in each of these directions.

The boom may be a single arm boom, in which case it will preferably have either a counterweight or a boom arm tip support (such as a wheel), or a multiple arm boom, the arms balancing each other. The boom arm or arms normally extend substantially the full effective internal radius of the vessel, and is conveniently a framework of the cantilever type. The boom is advantageously mounted or mountable on a pillar which pillar is itself mounted or mountable on the vessel floor centrally thereof; either the boom can pivot on the pillar or the pillar can pivot on the floor. The rotation-causing means is advantageously a pneumatic (to avoid the possibility of sparks) stepping motor (the angular step being adjusted to fit the required angular distance for the echo sounding points). The number of echo sounding means (preferably piezoelectric transducers) depend upon the size of the vessel (and thus the length of each boom arm); it is generally satisfactory to have a floor-directed transducer every three or four feet and one directed in the opposite direction towards the liquid surface every five to ten feet.

It will be appreciated that by utilising what may be termed "differential measurement" utilising the liquid surface as datum, errors due, for example, to tilting of the boom tend to be cancelled.

BRIEF DESCRIPTION OF THE DRAWINGS

One embodiment of the invention is now described though only be way of illustration, with reference to the accompanying drawings, in which:

FIG. 4 shows a schematic block diagram of the electronics associated with the inventive apparatus employed in the embodiment of FIGS. 1, 2 and 3, FIG. 5 shows in "pictorial" form the output of the apparatus on FIG. 4 recorded on tape for later analysis, and FIGS. 6A and B show diagrammatically the sort of final display that might be derived from the tape of FIG. 5.

DETAILED DESCRIPTION OF THE PREFERRED EMBODIMENT

Figure 1:
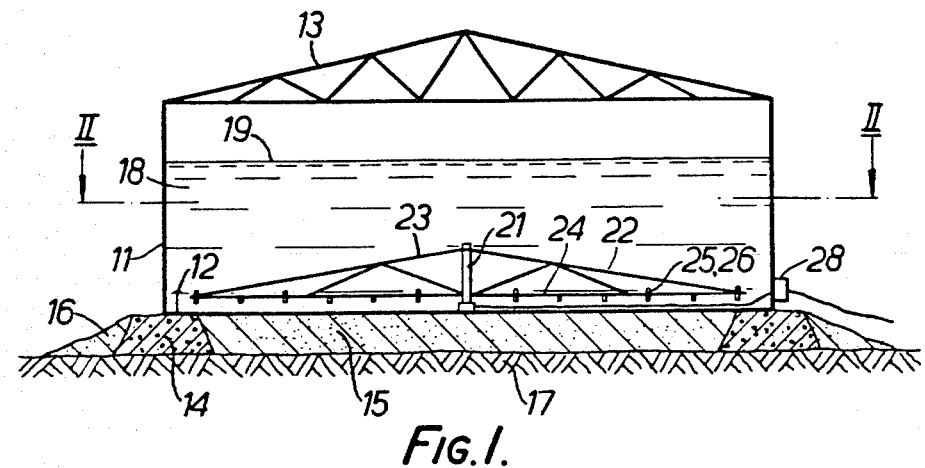
FIG. 1 shows diagrammatically a vertical axial cross section through an oil storage tank equipped to effect the inventive method.
Figure 2:
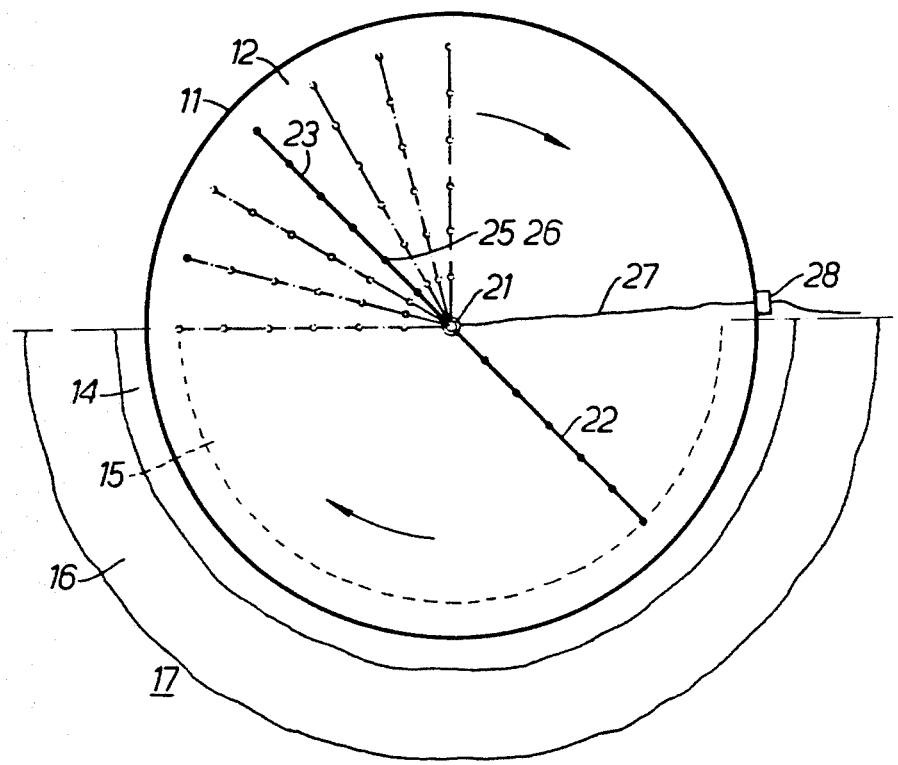
FIG. 2 shows diagrammatically a horizontal transaxial section (partly in see-through form) on the line II—II of FIG. 1.
Figure 3:
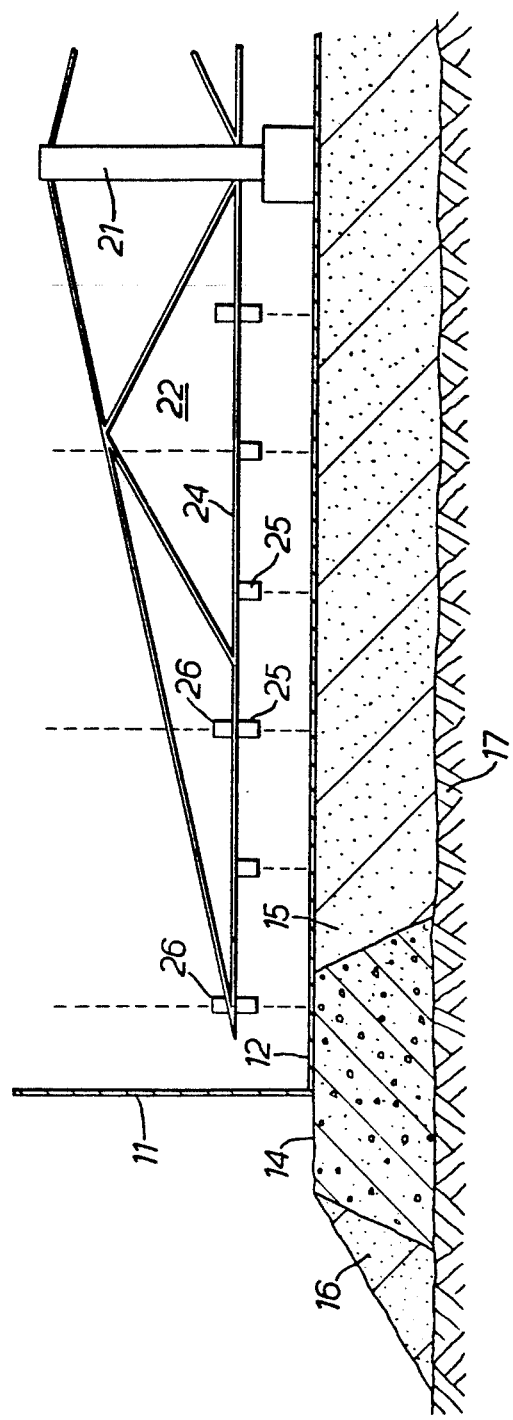
FIG. 3 shows diagrammatically a detail of FIG. 1.

The tank of FIGS. 1, 2 and 3 comprises conventional walls (11), baseplate (12) and girder-supported roof (13). It is built upon foundations which consist of a ring (14) of crushed rock with an inner filling (15) and outer ramp (16) of compacted sand, the whole being supported on the ground (generally 17). The tank, which is full of liquid 18 with a surface 19, is 150 ft in diameter and 50 ft tall.

Mounted centrally on the baseplate 12 and coaxial with the tank is a pillar (21) and mounted on the piller, for rotation about the axis by a pneumatically-actuated stepper motor (not shown), is a double-armed strutted boom (22, 23) with a framework of the cantilever type. The lower portion (as 24) of each boom arm is approximately horizontal and about 3 ft above the baseplate 12, and supports spaced along it a number of piezoelectric transducers some (as 25) pointing downwards towards the baseplate 12 and others (as 26) pointing in the opposite direction, upwards towards the roof 13. For clarity there are shown only 6 transducers per arm pointing down and 3 transducers per arm pointing up. Leads 27 to the stepper motor, and to and from the transducers 25, 26 pass from the base of the pillar 21, along the floor of the tank, and out through a gasketted (sealed) aperture 28 in the tank wall 11.

In operation (discussed further below) the boom arms 22, 23 are stepped round—as most clearly seen from FIG. 2, where by way of illustration seven positions defining one full quadrant are shown—and in each position the transducers 25, 26 are activated (preferably in sequence) to send and receive an ultrasonic pulse to and from both the tank floor 12 and the surface 19 of the liquid 18 in the tank. From the times of the received echo pulses there is computed the (relative) depth of the liquid—that is, the distance from the liquid surface 19 to the baseplate 12—for each transducer position, and from this informaton is derived a measure of any baseplate settlement that may have occurred.

The block diagram of FIG. 4 illustrates schematically the operation of the invention, and is to be considered together with the "pictorial" output tape shown in FIG. 5. The two Figures more or less speak for themselves, but may briefly be described as follows.

The PULSER comprises an oscillator and associated power amplifier to constitute a transmitter. This unit provides pulses of 60 KHz signals which supply the power to the transducers. These pulses are initiated or triggered from the CLOCK. The CLOCK circuit is a synchronizing oscillator producing regular pulses which keep the sequence of signals and switches locked together in a manner well established in system electronics. Suitable DELAY circuits are provided to make allowance for the liquid characteristics, tank geometry etc., to ensure rational collecting and presenting of the data. The T/R (transmit/receive) SWITCH either passes the transmitter signals from the PULSER to the SEQUENCING GATES and thence to the transducers (shown in FIG. 3) or it passes the return signals from the transducers via the sequencing gates to the RECEIVER. The SEQUENCING GATES are triggered in turn by the CLOCK to send successive pulses from the PULSER via the T/R SWITCH to the series of transducers (shown in FIG. 3) in turn. The KEYBOARD is providing to enable ancillary data to be entered into the RECORDER (this latter may be a magnetic, paper, or similar storage mechanism). All the constituent parts of the functions shown in the boxes are well known to electrical engineers concerned with this general type of system.

The block diagram shows switches (the sequencer gates) connecting the transmitter (pulser) via the transmit/receive switch to each transducer (R, $T^1$, $T^2$ etc) in sequence, where R leads to the upper, reference, transducers (26 in FIG. 3), and T1, T2, T3 etc. lead to the lower, measuring, transducers (25 in FIG. 3). Switches of this type are well known in many types of electrical circuits. The gates and the T/R switch also connect the return signal to the receiver for amplification and onwards transmission to the tape recorder (FIG. 5 shows a typical tape pulse format). Each time the clock generates a pulse this opens the next gate, fires the transmitter, and the clock pulse and the return pulse from that transducer are recorded. The delay $\delta$, between the clock pulse and the return pulse represents the distance of the reflecting surface (either the tank floor e.g. $\delta T'$ or the tank liquid surface, used as a reference e.g. $\delta r$).

Provision is made for additional information to be added from a keyboard between measurements at each angle of rotation $\theta$ of the boom. In addition, the boom angle can itself be measured and added to the recorded data.

Figure 6A:
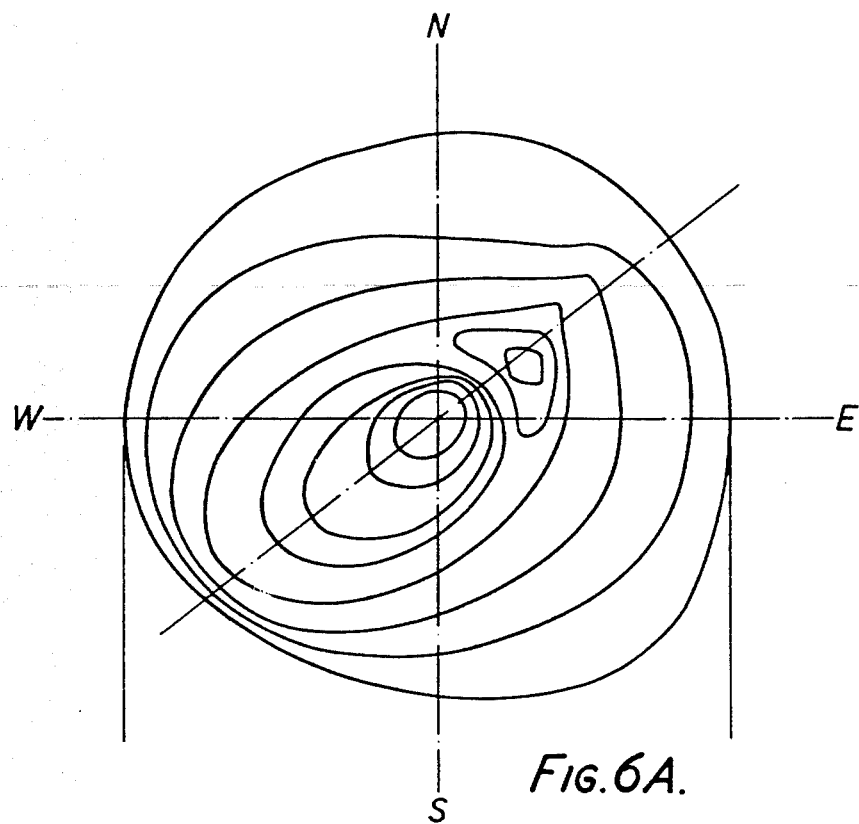
Figure 6B:
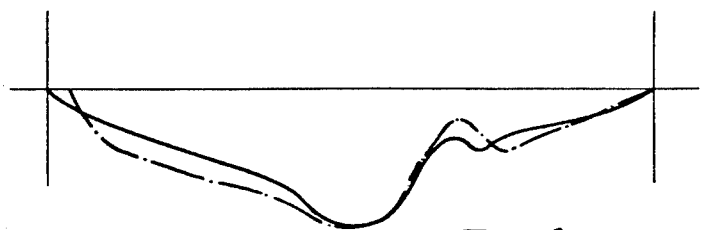

Finally, FIGS. 6A and B show, in extremely exagerated and purely illustrative form, a contour line/section display (either VDU or print out) of the type derivable from the taped pulse/echo data produced by the equipment of FIGS. 4 and 5. The solid line section of FIG. 6B is the section on the West-East line through the tank, while the dotted line section is that on the Southwest-Northeast line; the contours are at one inch intervals, and give a somewhat compressed view of the baseplate settlement over the two diameters of the floor.

We claim:

1. A method of detecting the settlement or distortion of the floor of a liquid-containing vessel, which method is particularly applicable to detecting or measuring baseplate distortion in soil-supported oil storage tanks of the type wherein the peripheral areas only of the tank are supported upon a rigid base, in which method there is employed a sonic echo sounding procedure utilizing sound transmitting and receiving transducer means, said method comprising the steps of:
   transmitting a sonic signal towards the vessel floor from each of a plurality of spaced points which are disposed beneath the surface of the liquid at generally-preselected locations within the vessel above the vessel floor and in known relationship with one another;
   receiving the sonic echo signal reflected back from the floor beneath each of the plurality of spaced points;
   using the time difference between the time of transmitting the sonic signal at each point and the time of receiving the sonic echo signal at the same point to furnish a measurement of the distance from each said point to the vessel floor; and,
   detecting any settlement or distortion of the vessel floor from said furnished measurements.

2. A method as claimed in claim 1 wherein the sonic echo sounding transducer means are piezoelectric transducers.

3. A method as claimed in claim 2 wherein the disposition, one from another, of said spaced points at which echo-sounding is effected are regularly distributed in a grid pattern.

4. A method as claimed in claim 3 wherein said grid pattern is a radial grid pattern centered on the floor center with, said spaced points being regularly spaced outwardly from the floor center along radii, and with each radius being equiangularly spaced from its immediate neighbours.

5. A method as claimed in claim 2 wherein said spaced points where echo sounding is effected are all at approximately the same height in a plane roughly two to three feet (60 to 90 cm) above the vessel floor; and further comprising: determining the distance from said plane to the surface of the liquid in the vessel by means of sonic echo sounding, and using the surface of the liquid in the vessel as the datum level for the determination of all distances.

6. A method as claimed in claim 1 or claim 5 further comprising utilizing the distance measurements obtained to provide a measure of the volume of liquid contained within the vessel which tends to take into account settlements or distortion of the vessel floor.

7. A method as claimed in claim 2 further comprising indicating any settlement of said floor in a visual form.

8. A method as claimed in claim 2 further comprising providing the piezoelectric transducers for effecting the echo sounding in an array which is arranged, in operation, to be moved from one set of points to another—as the "measurement" proceeds.

9. A method as claimed in claim 8 wherein the transducers for effecting the echo sounding are disposed in a linear array along a substantially rigid boom pivotally mounted at the vessel floor's centre so that it can sweep over the floor as the hand of a clock sweeps over the clock face.

10. Apparatus for detecting the settlement or distortion of the floor of a liquid-containing vessel, which apparatus is particularly applicable to detecting or measuring baseplate distortion in soil-supported oil storage tanks of the type wherein the peripheral areas only of the tank are supported upon a rigid base, which apparatus comprises:
    a plurality of sound transmitting and receiving transducer means, each for transmitting a sonic signal towards the vessel floor, and for receiving the sonic echo signal reflected back from the floor;
    mounting means for mounting said transmitting and receiving transducer means so that they will be positioned at or moveable between each of a plurality of spaced points which are disposed beneath the surface of the liquid at generally-preselected locations within the vessel and above the vessel floor in known relationship with one another;
    time measuring means, for measuring the time difference between the time of transmitting the sonic signal at each point and the time of receiving the sonic echo signal at the same point;
    ranging means, for using the measuring means output to furnish a measurement of the distance from each point to the vessel floor; and,
    indicator means for indicating from these measurements any settlement or distortion of the vessel floor.

11. An apparatus as claimed in claim 10 wherein said transducer means comprises a plurality of piezoelectric transducers.

12. Apparatus as defined in claim 10 wherein said means for mounting said transducer means comprises: a longitudinally-extended boom member with means for pivotally mounting same at or near one end centrally of a vessel floor for movement in a plane parallel thereto; means for causing the boom to move in that plane, rotating about its pivot mounting; and said plurality of transducer means are mounted along said boom with some pointing towards the vessel floor and some pointing away therefrom but at least one pointing in each of these directions.

13. Apparatus as claimed in claim 3 wherein said boom is a multiple arm boom with said arms balancing each other.

14. Apparatus as claimed in claim 3 or 13 and wherein said boom arm is arranged to extend substantially the full effective internal radius of the vessel.

15. Apparatus as claimed in claim 3 or 13 wherein said boom comprises a framework of the cantilever type.

16. Apparatus as claimed in claim 3 or 13 wherein the boom is mounted on a pillar which pillar is itself mountable on the vessel floor centrally thereof and either the boom can pivot on the pillar or the pillar can pivot on the floor.

* * * * *